APPARATUS FOR FORMING REPLACEMENT EXHAUST PIPES
AND METHOD OF USING SAME

Original Filed Dec. 15, 1961 3 Sheets-Sheet 1

INVENTOR.
BRUCE J. LANCE

BY
William C. Babcock
ATTORNEY

INVENTOR.
BRUCE J. LANCE

BY

William C. Babcock
ATTORNEY

INVENTOR.
BRUCE J. LANCE
BY
William R. Babcock
ATTORNEY

United States Patent Office

Re. 26,467
Reissued Oct. 1, 1968

26,467

APPARATUS FOR FORMING REPLACEMENT EXHAUST PIPES AND METHOD OF USING SAME

Bruce J. Lance, 1460 Chase Drive,
Corona, Calif. 91720

Original No. 3,196,661, dated July 27, 1965, Ser. No. 159,604, Dec. 15, 1961. Application for reissue May 31, 1967, Ser. No. 646,760
6 Claims. (Cl. 72—32)

Matter enclosed in heavy brackets [ ] appears in the original patent but forms no part of this reissue specification; matter printed in italics indicates the additions made by reissue.

*ABSTRACT OF THE DISCLOSURE*

*An improvement for use with a tube bending apparatus for forming replacement exhaust pipes for automotive vehicles from straight lengths of pipe when the longitudinal spacing between the bends is known, as well as the degree of angulation of the bends, and the degree of circumferential spacing of the bends one from the other.*

[The present invention relates generally to the field of automotive equipment, and more particularly to an apparatus for forming replacement exhaust pipes and method of using same.]

One rather vexatious problem encountered in the field of automotive equipment has been the replacement of exhaust pipes, due to the fact that the length and configuration of these pipes varies considerably from year to year, even in the same make of car. Thus, it is literally impossible for a dealer to inventory such replacement parts, even one for each make of car and yearly model thereof because of the large storage space required therefor. As a result there is usually a substantial delay encountered by the purchaser when he needs to replace an exhaust pipe, for a dealer ordinarily will not have one on hand and will have to order the particular exhaust pipe desired from a parts warehouse.

A primary object of the present invention is to provide an apparatus and method of using same which permit an exhaust pipe for any make of [auomobile] *automobile* and yearly model thereof to be quickly and easily fabricated from straight tubing stock when a replacement exhaust pipe is ordered.

Another object of the invention is to not only supply such an apparatus, but one that permits the convenient and easy flaring of the tubing by use of the same power source utilized in the fabrication of the exhaust pipes.

Still another object of the invention is to provide an exhaust pipe forming apparatus that is capable of quickly and accurately forming replacement exhaust pipes which is so simple in operation that it can be successfully utilized by those having little or no technical ability.

Yet another object of the present invention is to provide an apparatus and method of using same in the fabrication of replacement exhaust pipes that can be either permanently located or transported on a trailer for use in the field.

These and other objects of the persent invention will become apparent from the following description thereof and from the accompanying drawings in which.

Figures 1, 2, 3, 4, 12, 13:
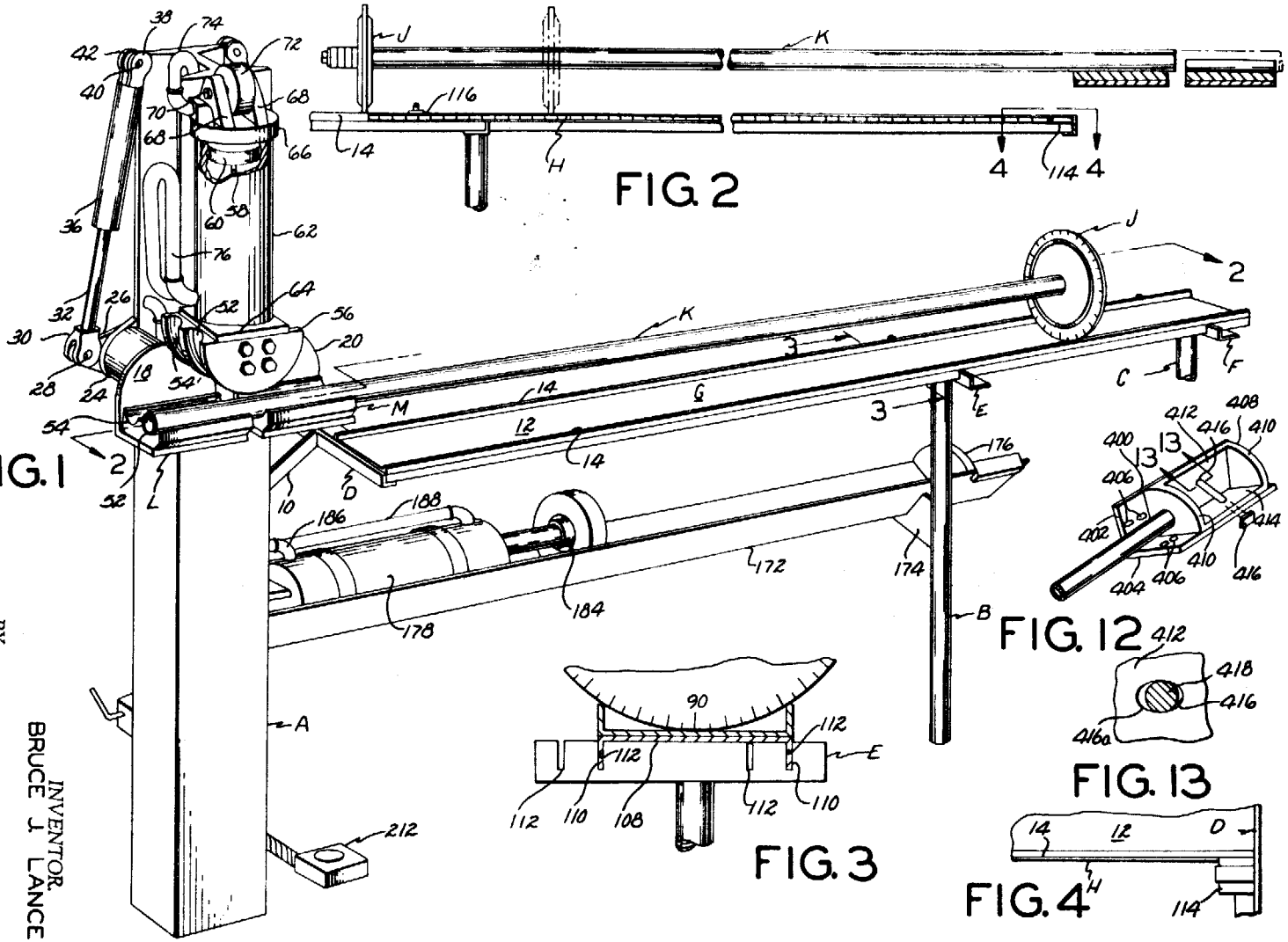
FIGURE 1 is a perspective view of the apparatus in which a straight length of tubing is disposed prior to any bending of the tubing.
FIGURE 2 is a side elevational view of the upper portion of the apparatus taken on line 2—2 of FIGURE 1.
FIGURE 3 is a combined vertical cross-sectional and side elevational view of that portion of the apparatus taken on line 3—3 of FIGURE 1.
FIGURE 4 is a fragmentary top plan view of the invention taken on line 4—4 of FIGURE 2.
FIGURE 12 is a fragmentary perspective view of an alternate form of stop.
FIGURE 13 is a cross-sectional view of the stop, taken on line 13—13 of FIGURE 12.
Figure 5:
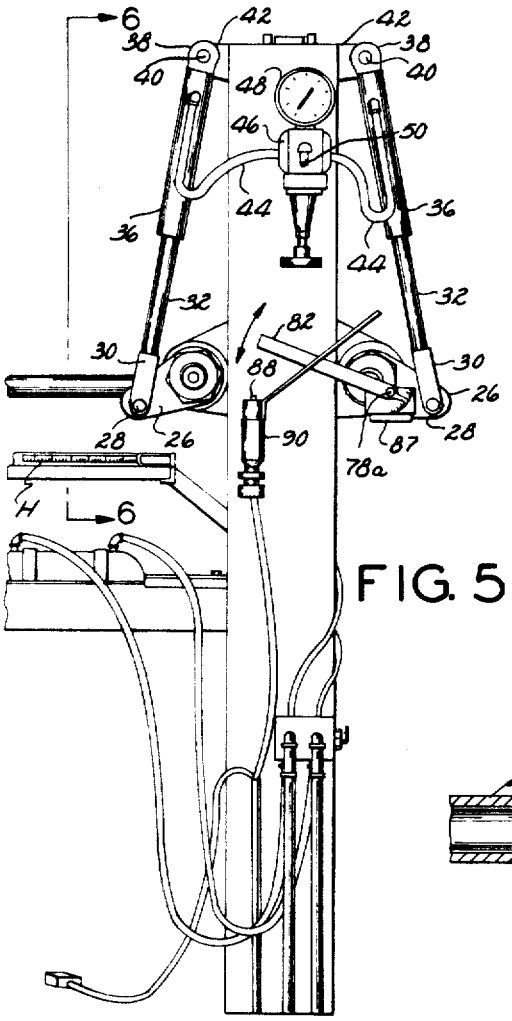
FIGURE 5 is a side elevational view of that portion of the apparatus shown at the left-hand end thereof in FIGURE 1.
Figure 6:
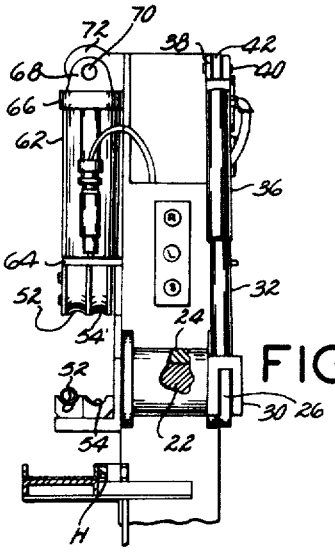
FIGURE 6 is an end elevational view of the upper portion of the apparatus shown in FIGURE 5, taken on line 6—6 thereof.

Referring now to FIGURES 1, 5 and 6 for the general arrangement of the apparatus, it will be seen to include a vertical column A and two uprights B and C spaced therefrom. The lower portions of the column A and uprights B and C can be embedded in concrete, or affixed to a suitable base (not shown) if the apparatus is to be portable or occasionally moved from one location to another.

A transversely disposed angle iron D is supported by a bracket 10 from column A. Second and third transversely positioned angle irons E and F are supported from the upper ends of uprights B and C respectively. Angle irons D, E and F are in longitudinal alignment. A protractor support G that is defined by an elongate rectangular web 12 and two parallel flanges 14 which project upwardly from the sides thereof is supported by the members D, E and F. Support G may be moved laterally on these angle irons for reasons to be hereinafter explained.

A tape measure H or other measuring device extends longitudinally along one exterior surface of flange 14 as best seen in FIGURE 2. A circular protractor J that is graduated in quadrants is removably mounted in one end of a straight length of tubing K to be bent into a replacement exhaust pipe. The protractor J is rotatably supported between opposite upper edge portions of the flanges 14, as best seen in FIGURE 1.

Two tube bending jaws L and M are longitudinally aligned (FIGURE 1) and are rigidly affixed to two heavy plates 18 and 20 respectively. Plates 18 and 20 are affixed to the forward ends of two identical short shafts 22, which are rotatably supported in bearings 24 affixed to opposite sides of column A. Arms 26 project outwardly from the rear ends of shafts 22. A pin 28 extends through each of the arms 26 and pivotally engages the bifurcated end 30 of a piston rod 32. Each piston rod 32 has a piston 34 mounted on the upper end thereof, and these pistons are longitudinally movable in two downwardly and outwardly extending cylinders 36. Cylinders 36 have eyes 38 on the upper ends thereof through which pins 40 extend. Pins 40 are supported by lugs 42 that project outwardly from the upper portion of column A. Fluid under pressure can be introduced into cylinders 36 through two hoses 44, which are connected to a pressure control valve 46. Valve 46 has a pressure gauge 48 connected thereto, as illustrated in FIGURE 5. Hydraulic fluid under pressure is supplied to the valve 46 through a hose 50.

Jaws L and M, as best seen in FIGURE 1, have two laterally spaced, longitudinally extending grooves 52 and 54 formed therein. The grooves 52 are preferably one and three-quarter inches in diameter and grooves 54 two inches in diameter. These dimensions for grooves 52 and 54 are so selected inasmuch as most exhaust pipes used on automotive vehicles currently in use are either one and theee-quarter or two inches in external diameter. The grooves 52 and 54 in jaw L are in longitudinal alignment with grooves 52 and 54 of identical configuration formed in the jaw M. A semi-circular pressure member 56 is centrally located relative to the jaws L and M when they are in the positions shown in FIGURE 1. Two semicircular grooves 52' and 54' are formed in pressure member 56 which are vertically aligned with the grooves 52 and 54. The pressure member 56 is located on the lower end of a piston rod 58, the upper end of which is connected to a piston 60.

Piston 60 is slidably movable within the confines of a hydraulic cylinder 62 that has a lower end 64 which the piston rod 58 slidably and sealingly engages. The hydraulic cylinder 62 has a closed upper end 66 and two laterally spaced lugs 68 project upwardly therefrom. A horizontal pin 70 extends through lugs 68 as well as through an outwardly extending part 72 of the upper portion of column A, to support the hydraulic cylinder 62 in a depending position. A hydraulic liquid under pressure can be discharged into the upper confines of the hydraulic cylinder 62 through a conduit 74 to force the piston 60, piston rod 58, and pressure member 56 downwardly. Likewise, when fluid is permitted to escape through the conduit 74, fluid can be discharged into the lower confines of the cylinder 62 through a conduit 76 to force the piston 60, piston rod 58, and pressure member 56 upwardly to place the pressure member in the position shown in FIGURE 1.

When fluid under pressure is discharged through the conduit 74 into the hydraulic cylinder 62, the piston 60, piston rod 58, and pressure member 56 are moved downwardly for either the groove portion 52' of the pressure member or groove portion 54' thereof to engage a desired portion of the tubing K, and as a downward force is applied to this engaged portion, the jaws L and M pivot outwardly away from one another to impart a curve of a desired degree to the portion of the tubing K situated between the pressure member 56 and the jaws. Jaws L and M resist this outward movement in opposite directions, and the degree of this resistance is dependent on the magnitude of the force exerted by the piston rods 32 on the arms 26. The degree of resistance the piston rods 32 will exert on arms 26 is, of course, dependent on the pressure at which fluid is discharged through the pressure control valve 46 to the upper confines of the cylinders 36.

As soon as the pressure member 56 ceases to apply a downward force to the portion of tubing K situated within the jaws L and M, and the pressure member starts to move upwardly to the position shown in FIGURE 1, the fluid under pressure in the cylinders 36 starts to move the piston rods 32 downwardly to return jaws L and M to the horizontally aligned positions shown in FIGURE 1. One of the shafts 22 has a rearwardly threaded extension 78 that adjustably supports a pointer 80 thereon which includes an extension 82 extending outwardly to the left, as may best be seen in FIGURES 5 and 7.

Figure 7:
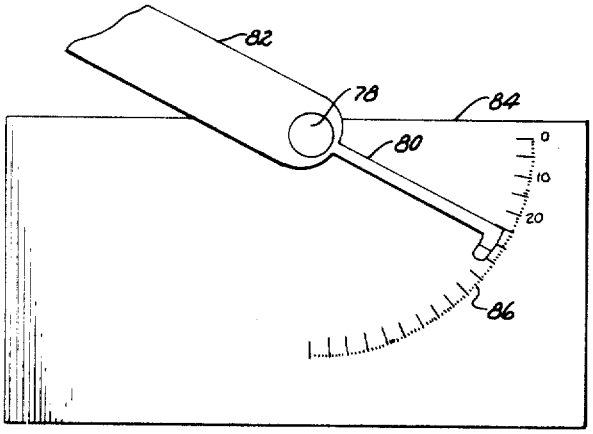
FIGURE 7 is a side elevational view of a portion of the apparatus that indicates the degree of longitudinal curvature which has been imparted thereto.

A protractor plate 84 is rigidly supported from one of the bearings 24 by a bracket 87. Plate 84 has graduations 86 marked or imprinted thereon that run from 0° to 90°, as shown in FIGURE 7. The pointer 80 may be circumferentially adjusted relative to the extension 78 by locking means 78a provided thereon so that when one of the jaws L or M has been pivoted to a desired angle due to downward movement of the pressure member 56, the extension 82 will contact an actuating button 88 of a limit switch 90 which, by means later to be described, will cause fluid to cease discharging into the cylinders 62 through the conduit 74 and cause concurrent discharge of fluid through conduit 76 into the confines of cylinder 62 to lift the piston 60, piston rod 58, and pressure member 56 upwardly to the position shown in FIGURE 1.

Figure 9:
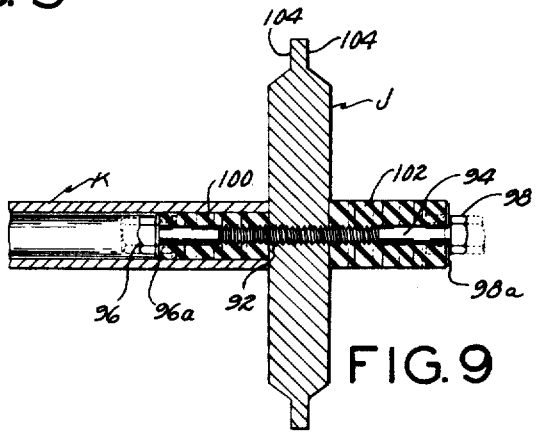
FIGURE 9 is a vertical cross-sectional view of the protractor taken on line 9—9 of FIGURE 8.

The protractor J (FIGURES 8 and 9) has a centrally disposed tapped bore 92 formed therein. A threaded rod 94 engages bore 92, and this rod has heads 96 and 98 affixed to the ends thereof. Washers 96a and 98a are mounted on rod 94 adjacent heads 96 and 98. A number of cylindrical resilient segments 100 and 102 through which bores extend are mounted on rod 94. Segments 100 are disposed between washer 96a and the left-hand side of protractor J as illustrated in FIGURE 9. Segments 102 are situated between the right-hand side of the protractor and the washer 98a, as also shown in this figure.

Figure 8:
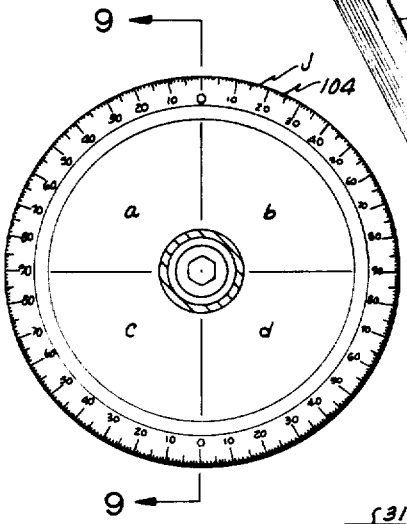
FIGURE 8 is a side elevational view of the protractor that is mounted on one end of the tubing as shown in FIGURE 1.

In the non-deformed condition segments 100 are of such transverse cross section as to be slidably insertable within the interior end portion of tubing K of the one and one-half inch size, and the segments 102 may similarly be disposed in the end portion of a tubular member K of the one and three-quarter inch size. By rotating rod 94 in an appropriate direction, the head 96 can be caused to move from the position shown in phantom line to that shown in solid line in FIGURE 9. This movement of rod 94 on the left-hand side of protractor J causes the segments 100 to be longitudinally compressed and radially expanded to grip the interior end portion of the tubular member K. [Similarily] *Similarly*, the segments 102 can be longitudinally compressed and radially expanded to grip the interior end portion of tubing K of one and three-quarter inch diameter. The protractor J has graduations 104 imprinted on both sides thereof (FIGURE 8).

When the protractor J is mounted on the right-hand end of the tubing K, as shown in FIGURE 1, it rests on the upper edges of the flanges 14 of supporting member G. The inner edges of one of the flanges 14 may serve as a reference edge for the graduations 104 on the protractor J. The diameter of protractor J is such that when [resing] *resting* on the flanges 14, it cooperates with either groove 52 or 54 to support the tubing K in a substantially horizontal position.

Figure 10:
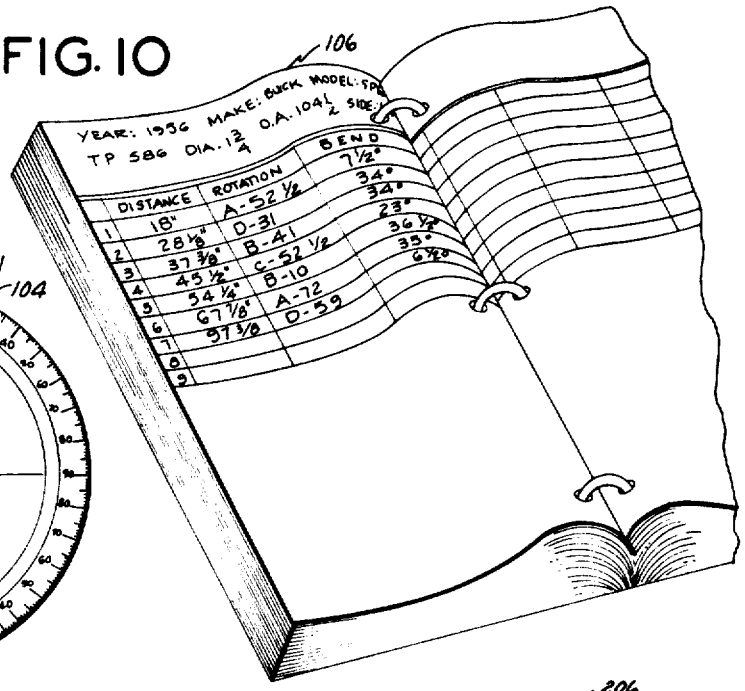
FIGURE 10 is a perspective view of a book having a number of looseleaf sheets therein carrying thereon the longitudinal spacing of the bends required in an exhaust pipe for a particular make of automobile and yearly model thereof as well as the circumferential spacing of these longitudinally extending bends relative to one another.

A loose-leaf binder or other book 106 is provided (FIGURE 10) which carries tabulations therein for each make of automobile, and each yearly model thereof, showing the diameter of the exhaust pipe, the length thereof, the longitudinal distances between the bends therein, the degree of each bend, and the rotational relationship in degrees of each bend relative to the bends disposed most adjacent thereto.

In FIGURE 1 it will be seen that the protractor support G is laterally movable on the angle irons D, E and F within a limited range. An inverted channel-shaped member 108 is affixed to the under side of support G. Flanges 110 of member 108 are adapted to removably engage either of two pairs of downwardly extending slots 112 formed in the angle irons E and F as best seen in FIGURE 3. The slots 112 permit the protractor support G to be moved laterally to a first position where the center of the protractor J and the grooves 52 are in longitudinal alignment, and to a second position where the center of the protractor and the center line of grooves 54 are similarly aligned. Thus, the protractor J is adapted to support tubing K of one diameter in a horizontally aligned position with the grooves 52 as shown in FIGURE 1, or by shifting the support G to the second position, the protractor may support the tubing K in a horizontally aligned position with the grooves 54. Whether the protractor support G will be in the first position or the second position is determined either by consulting the appropriate page in the binder 106, or by actually measuring the diameter of the exhaust pipe.

The first step in fabricating the tubing K to conform to the configuration of the exhaust pipe (not shown) to be replaced is to determine the overall length of tubing K required, which is preferably achieved by consulting the appropriate page in the binder 106. The protractor J is then removably mounted on the tubing K that has been cut to the correct length. Thereafter the tubing K is disposed as shown in FIGURE 9 with the left-hand end portion thereof resting in either the grooves 52 or 54 depending on the diameter of the tubing K and with the protractor J on the support G. Binder 106 is then consulted to determine the longitudinal distance of the center of the first bend from the left-hand end of the tubing K, which in the illustration given would be eighteen inches. The tubing K and protractor J are then moved relative to the support G, and by use of the measuring tape H the tubing is so positioned as to permit a bend of seven and one-half degrees to be formed in tubing K when the pressure member 56 is caused to move downwardly relative to the jaws L and M.

The rotational spacing between the bends is determined from the central column entitled "Rotation" in the binder 106. Thus, to form the first bend in tubing K at eighteen inches from the left-hand end thereof, the protractor J is so disposed that the quadrant *a* thereof is positioned adjacent the reference, which may be one of the edges of the flanges 14 or other desired reference point, and the protractor is rotated until fifty-two and one-half degrees as imprinted thereon is in alignment with the reference previously mentioned.

By consulting the binder 106 it will be seen that the second bend is twenty-eight and one-eighth inches from the left-hand end of tubing K, as illustrated in FIGURE 1. As the tubing K and protractor J are moved to form bends therein, the protractor J occupies a succession of positions on the support G, one of which is shown in phantom line in FIGURE 2.

The tape H is preferably of the well known resilient steel strip type which is windable upon a spring-loaded reel (not shown) encased in a housing 114 affixed to one exterior side of one of the flanges 14, as best seen in FIGURE 2. The free end of tape H is removably held at a desired position relative to one of the flanges 14 by a spring-loaded clip 116. This position is normally one in which the tape H is unreeled to the length of the cut tubing K that is to be bent to form a replacement exhaust pipe.

After the tubing K and protractor J have been moved to the second position to place a portion of the tubing twenty-eight and one-eighth inches from the left-hand end thereof under the pressure member 56, the tubing and protractor are rotated to align thirty-one degrees in quadrant d of the protractor with the reference previously mentioned. The pressure member 56 is thereafter caused to move downwardly to form a second bend of thirty-four degrees in tubing K by means of controls to be described in detail hereinafter.

This operation is performed successively until all seven of the bends specified in binder 106 have been completed, and the tubing K will have been transformed into a replacement exhaust pipe. In the event the tubing K is to be transformed into an exhaust pipe on which no bending data is available in printed form in binder 106, then this information must be obtained directly from the exhaust pipe by measurement.

Movement of the pressure member 56 upwardly and downwardly occurs concurrently with movement of the piston 60 and piston rod 58. The piston 60 is moved downwardly in the hydraulic cylinder 62 when hydraulic fluid under pressure is discharged therein through the conduit 74, with that fluid trapped under the piston 60 in the cylinder 62 discharging through the conduit 76. Conduits 74 and 76 are connected to a valve 120 that is manually controlled by a handle 122. Valve 120 is normally in a first position that permits the free flow of fluid therethrough to the conduits 74 and 76.

Figure 11:
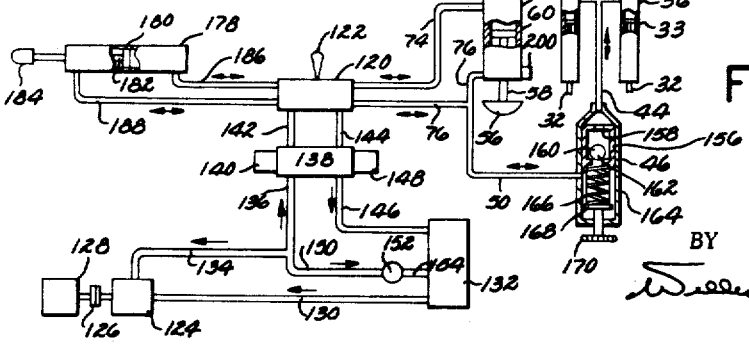
FIGURE 11 is a schematic diagram of the hydraulic system used in the apparatus.

A pump 124 is provided, as may best be seen in FIGURE 11, that may be mounted in any convenient location relative to the column A. Pump 124 is driven by a coupling 126 that in turn is connected to an electric motor 128. The suction of pump 124 is connected by a conduit 130 to the lower portion of a reservoir tank 132 that is preferably concealed within the lower portion of column A.

Fluid is discharged from the pump 124 through a conduit 134 that is in communication with a conduit 136 which extends to a multi-position valve 138. Valve 138 can be moved to a first position by energization of a solenoid 140. When the solenoid 140 is energized, fluid is discharged through the valve 138 to flow through a conduit 142 to the valve 120, and from this valve through the conduit 74 to the upper confines of the cylinder 62 to move the piston 60 and pressure member 56 downwardly. When the valve 138 is in this first position, fluid can flow from the conduit 76 through the valve 120 to a conduit 144 that is connected to the valve 138. Fluid enters the valve 138 from the conduit 144 and is discharged to a conduit 146 that returns the fluid to the reservoir 132.

When a second solenoid 148 forming a part of the valve 138 is electrically energized, this valve is moved to a second position where fluid discharges therefrom in a path the reverse of that previously described. In this second path, the fluid from valve 138 flows through the conduits 144 and 76 to the lower portion of the cylinder 62 to raise the piston 60, piston rod 58, and pressure member 56 to the position shown in FIGURE 1. Concurrently with this upward movement of the pressure member 56, fluid is discharged from the upper portion of the cylinder 62 through the conduit 74, valve 120, conduit 144, valve 138, and conduit 146 to return to the reservoir 132.

To prevent the build-up of a dangerously high pressure by the pump 124 in conduit 134, a conduit 150 is connected to the conduit 136, and this conduit 150 extends to a pressure relief valve 152 that is set for any desired maximum pressure. When this pressure is exceeded, the valve 152 opens and permits fluid to discharge through a conduit 154 to the reservoir 132.

The jaws L and M resist pivotal movement to a desired degree as the pressure member 56 moves downwardly, due to discharge of hydraulic fluid under a selected pressure from the valve 46 through the hoses 44 to the upper portion of the pistons 36. As fluid is discharged through the conduit 76 to move the piston 60, piston rod 58, and pressure member 56 upwardly, fluid is also discharged from the conduit 76 through a conduit 50 into the back pressure valve 46, the details of which are best seen in FIGURE 11. The valve 46 has a discharge [openening] *opening* formed therein that is connected to the hoses 44.

In detail, the back pressure valve 46 includes an inverted cup-shaped piston 156 that has a number of ports 158 formed in the upper portion thereof, and a ball 160 of lesser diameter than the interior of the piston is disposed within the confines thereof. The ball 160 is adapted to be forced into sealing contact with a seat 162 forming a part of the piston. Piston 156 is at all times urged upwardly in a cylindrical housing 164 by a helical spring 166, the lower end of which rests on a plate 168 that may be moved longitudinally relative to the housing by an adjustment handle 170. Movement of the plate 168 relative to the housing 164 varies the compression on spring 166. When fluid is discharged into the housing 164 through the conduit 50 as the piston 60 in cylinder 62 is moved upwardly, the ball 160 is moved from seat 162 and fluid can flow past the ball through the conduits 44 into the confines of the cylinders 36 to dispose the jaws L and M in the horizontal position shown in FIGURE 1. Movement of the jaws above the horizontal position shown in FIGURE 1 is prevented by stops (not shown).

The ball 160, which acts as a check, prevents flow of fluid from the conduit 50 into the conduit 44. However, when the piston rods 32 and pistons 33 connected thereto tend to move upwardly in the cylinders 36, due to outward pivotal movement of the jaws L and M as the pressure member 56 exerts a downward force on the tubing K, the flow of fluid through the [conduicts] *conduits* 44, valve 46 to the conduit 50, is resisted by the spring 166. The ball 160 is then in sealing [engagment] *engagement* with the seat 162 and fluid can discharge from the conduit 44 to the conduit 50, for the piston 156 and the ball 160 move downwardly as an integral assembly until the upper extremity of the piston is disposed below the opening in the valve housing 164 that is in communication with the conduit 50.

This compression exerted by the spring 166 affords the desired resilient loading to restrain the pivotal movement of the jaws L and M during the bending operation. After a bend of the desired degree is formed in the tubing K due to downward movement of the pressure member 56, piston 60 and piston rod 58, and the pressure member 56 is moved to the upper position shown in FIGURE 1, fluid is again discharged into the cylinders 36 as previously described, with this trapped fluid then being so situated that a restraint of desired magnitude will be imparted to jaws L and M the next time the pressure member 56 is moved downwardly to form another bend in the tubing K.

In the forming of tubing K to transform the same into an exhaust pipe of desired configuration, it is desirable that the ends thereof be flanged or expanded. For this purpose, a V-shaped trough 172 is provided that extends longitudinally under the protractor support member G, as shown in FIGURE 1. The left-hand end of trough 172 is affixed to column A, and the right-hand portion of the trough is affixed by a bracket 174 to the upright B. Trough 172 has a stop 176 mounted on one end thereof, against which one end of the tubing K may abut. A second hydraulic cylinder 178 (FIGURE 11) is longitudinally disposed in the right-hand end portion of the trough 172 and has a piston 180 slidably mounted therein. Piston 180 is connected to a piston rod 182 that extends from the right-hand end of the cylinder 178 (FIGURE 1). A punch 184 is mounted on the end of piston rod 182, which punch when inserted in an end portion of the tubing K at the time the opposite end portion of the tubing abuts against the stop 176, can expand and flare the engaged end portion of the tubing.

When the handle 122 of the valve 120 is moved to a second position, fluid can be supplied through either conduit 186 or 188 connected to the end portions of the cylinder 178 to cause movement of the piston 180, piston rod 182, and punch 184 either to the right or left as illustrated in FIGURE 11. When the valve 120 is in the second position, the fluid that flows through the conduits 142 and 144 is diverted to the conduits 186 and 188, rather than to conduits 74 and 76 as previously described in connection with the operation of the pressure member 56.

Figure 14:
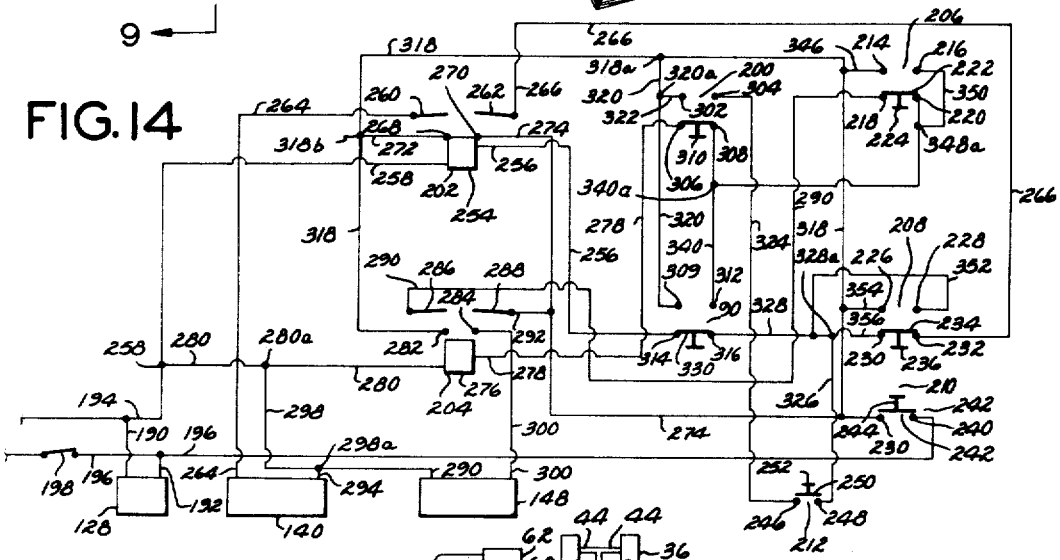
FIGURE 14 is a schematic wiring diagram of the electrical system used with the apparatus.

The electrical system used in operating the invention is shown in FIGURE 14. As illustrated therein, electrical energy is supplied to the motor 128 from two electrical conductors 190 and 192 that are connected to conductors 194 and 196 respectively. Conductors 194 and 196 are connected to a source of domestic electrical energy (not shown). Conductor 196 has a normally open, manually operable switch 198 included therein which must be closed prior to electrical energization of the system. The system, as can be seen in FIGURE 14, includes the switch 90, which when the pressure member 56 has moved downwardly sufficiently to impart a desired degree of bend to the tubing K, is moved to a second position where the solenoid 148 is energized, to dispose the valve 138 in a second position, whereby fluid is discharged to the cylinder 62 to move the piston 60, piston rod 58, and pressure member 56 upwardly to the position shown in FIGURE 1.

A switch 200 is provided, as may be seen in FIGURES 11 and 14, which when the pressure member 56 has been moved upwardly to the position shown in FIGURE 1, causes energization of the solenoid 148 to move the valve 138 to a second position. The system also includes a first relay 202 and second relay 204. Also, the electric circuit includes manually operable switches 206 and 208. When the switch 206 is moved to a second position, the circuit is energized to cause the valve 138 to be so disposed that the member 56 is moved upwardly, and likewise when the switch 208 is moved to a second position, the valve 138 is so disposed as to cause the pressure member 56 to move downwardly.

A manually operable switch 210 is provided that is normally closed, but if manually open at any time, immediately breaks the circuit to terminate further operation of the invention until the switch 210 is returned to the closed position as shown in FIGURE 14. A normally open switch 212 is provided, which must first be closed to place the invention in a condition to bend the tubing K as previously described in detail.

The switch 206 includes two pairs of contacts 214, 216 and 218, 220. The contacts 218, 220 are normally in electrical communication by means of an electrical conducting blade or bar 222 that may be moved to engage the contacts 214 and 216 by means of a handle or button 224. Switch 208 includes two pairs of contacts 226, 228 and 230, 232. Contacts 230, 232 are normally in electrical communication by means of an electrical conducting blade or bar 234 which is capable of being moved to engage the contacts 226, 228 by means of a handle or button 236.

The switch 210 includes two contacts 238, 240 that are normally in electrical communication by means of an electrical blade or bar 242 which is in engagement therewith. Blade 242 may be moved out of engagement with the contacts 238, 240 by use of a handle or button 244 connected to the blade. Switch 212 includes two contacts 246, 248 that may be placed in electrical communication by means of an electrical conducting blade or bar 250 which is moved into physical engagement therewith by means of a handle or button 252.

The first relay 202 includes a solenoid 254 that is connected to conductors 256 and 258. Relay 202 also includes two armatures 260, 262 that are connected to conductors 264 and 266 respectively. When solenoid 254 is energized the armatures 260 and 262 are caused to engage contacts 268 and 270, respectively. Contact 268 is connected to conductor 272 and contact 270 to a conductor 274.

The second relay 204 includes a solenoid 276 that is connected to conductors 278 and 280. Relay 204 also includes two contacts 282 and 284 that can be engaged by armatures 286 and 288 respectively when the solenoid 276 is energized. The armature 286 is connected to a conductor 290, and the armature 288 to a conductor 292. One end of each winding of solenoids 140 and 148 is connected by conductors 294 and 296 respectively to a conductor 298. The other end of the winding on solenoid 140 is connected to the conductor 264, and the other end of the winding on solenoid 148 is connected by a conductor 300 to contact 284 of relay 204.

The switch 200 includes two pairs of contacts 302, 304 and 306, 308. Contacts 302, 304 are in electrical communication by means of an electrical conducting bar 310 when the pressure member 56 is in the up position shown in FIGURE 1. As soon as the pressure member 56 leaves the up position, the electrical conducting bar 310 moves to engage the contacts 306, 308. The switch 90 includes two pairs of contacts 309, 312 and 314, 316. An electrical conducting bar 330 is in engagement with contacts 309, 312 when the pressure member 56 is in the lowermost position, but moves to engage the contacts 314, 316 as soon as the pressure member 56 starts to move upwardly. The conductor 258 extending from solenoid 254 of relay 202 is connected to conductor 194 at junction 258a to form one leg of the circuit that energizes relay 202. When the pressure member 56 is in the uppermost position shown in FIGURE 1, the bar 310 is in engagement with contacts 302, 304 of limit switch 200.

To actuate the apparatus and cause the pressure member 56 to move downwardly to bend tubing K, the bar 250 is first moved into engagement with contacts 246, 248 of switch 212. Electrical energy can then flow from junction point 318a on conductor 318, through conductors 320, junction point 320a, conductor 322, contact 302, bar 310, contact 304, conductor 324, contact 246, bar 250, contact 248, conductor 326, junction point 328a, conductor [,] 328, contact 316, bar 330 of switch 90, contact 314 and conductor 256 to solenoid 254.

Energization of solenoid 254 in relay 202 causes armatures 260 and 262 to move into engagement with contacts 268 and 270. Electrical current flows from conductor 318 through junction point 318b, conductor 272 and contact 268, armature 260, conductor 264, to solenoid 140. The other leg of the circuit to solenoid 140 is provided by conductor 294, junction point 298a, conductor 298, junction point 280a, conductor 280, junction point 258a, and conductor 194.

Energization of solenoid 140 causes valve 138 to move to a first position where fluid is discharged through conduit 142 to move the piston 60, piston rod 58, and pressure member 56 downwardly. After pressure member 56 starts to move downwardly, the bar 310 of switch 200 moves to engage contacts 306, 308. However, armature 262 of relay 202 is now in engagement with contact 270, and electrical energy flows from conductor 274 to conductor 266, contact 232, bar 234, contact 230, conductor 328, contact 316, bar 330, contact 314, conductor 256 to the solenoid 254 of relay 202.

After the pressure member 56 completes the downward movement for which the pointer 80 and extension 82 thereof are set relative to the protractor graduations 86 on plate 84, the bar 330 is moved out of engagement with contacts 314, 316 and placed in engagement with contacts 310 and 312. The circuit to the solenoid 254 of relay 202 is broken, and the solenoid 140 of valve 138 is no longer electrically energized.

Movement of the bar 330 to engage contacts 310 and 312 completes a circuit from the conductor 320 to conductor 340, contact 308, bar 310, contact 306, conductor 278 to solenoid 276 of relay 204. The other leg of the circuit to the solenoid 276 of relay 204 includes conductor 280, junction point 280a, and conductor 194. Energization of the relay causes the armatures 286 and 288 to engage the contacts 282 and 284 respectively. One leg of the circuit which energizes the solenoid 148 to move the [value] *valve* 138 into a second position where liquid will discharge through the conduit 76 to the lower interior thereof to raise the pressure member [58] *56*, comprises the conductor 274, conductor 292, armature 288, contact 284 and conductor 300 to the solenoid 148. The other leg of the circuit which energizes the solenoid 148 includes the conductor 296, junction point 298a, conductor 298, junction point 280a, conductor 280, junction point 258a, and conductor 194.

After the pressure member 56 starts to move upwardly, the bar 330 moves to engage the contacts 309, 312 of the switch 90. An electrical circuit is then completed through the conductor 320, contact 310, bar 330, contact 312, conductor 340, contact 308, bar 310, contact 306, conductor 278, to solenoid 276 of relay 204. The second leg of the circuit to the solenoid 276 of relay 204 is provided by conductor 280, contact 280a, conductor 280, junction [258,a] *258a* and conductor 194. When the pressure member 56 has risen to the top of its stroke, it engages switch 200, with bar 310 being moved to a position where it is in engagement with contacts 302, 304, and the circuit to energize the solenoid 148 of valve 138 is broken.

In the event it is not desired to operate the apparatus automatically, the same results can be achieved manually. For manual operation the bar 222 of the first switch 206 is moved from the position shown in FIGURE 14 to engage the contacts 214 and 216. The contact 214 is connected to conductor 318 by a conductor 346. Contact 220 is connected to junction point 340a by a conductor 348. The contact 216 is connected by a conductor 350 to junction point 348a in conductor 348. Similarly, when the bar 234 of switch 208 is moved manually to engage the contacts 226 and 228, the solenoid 202 may be actuated to energize solenoid 140. Contact 228 is connected to conductor 328 by a conductor 352, and [contacts] *contact* 226 is connected to conductor 318 by a conductor 354. A conductor 356 connects contact 230 to junction point 328a.

A first alternate form of the trough 172 is shown in FIGURES 12 and 13 wherein it will be seen to include an L-shaped trough 400 defined by angularly disposed walls 402 and 404 in which a number of longitudinally spaced, transversely aligned bores 406 are formed. A stop 408 is provided which has longitudinally spaced, parallel end walls 410 that are joined by side walls 412 and 414 that are in angular relationship. Side wall 412 is shown in FIGURE 12 disposed adjacent wall 402. The side walls 412 and 414 have two transversely aligned bores 416 formed therein of a generally oval cross section. A bolt or pin 418 is provided that may extend through any one of the pairs of bores 406 as well as through the bores 416.

When a length of tubing K is disposed in the trough 400 whereby the punch 184 engages the left-hand end thereof to form the same into a flare, the right-hand end of the tubing K is forced into pressure contact with the end 410 of the stop 408 as shown in FIGURE 12. It will be apparent that this force tends to move the stop 412 to the right, and when such a force is exerted on the stop, the lower curved end portion 416a of the bores 416 (FIGURE 13) tends to slide under the pin 418, and in so doing forces the stop 412 into tight gripping contact with the interior surface of the trough 402.

Each bore 416 not only has a major axis greater than the diameter of the pin 418, but a minor axis that is slightly greater than the diameter of the pin. The bores 416 are preferably longitudinally off-centered in walls 412 and 414, and are situated nearer one of the end pieces 410 than to the other end piece. In this manner, the positioning of the stop 408 can easily be reversed from that shown in FIGURE 12 to place the side walls 412 and 414 adjacent to the side walls 404 and 402 respectively. The position of end wall 410 shown to the right in FIGURE 14 is then reversed, with this particular end wall being spaced a different distance from the column A, even though the pin 418 continues to engage the same pair of bores 406 shown in FIGURE 12. The first alternate form of the trough 400 (FIGURE 12) may be supported on the apparatus in the same manner as the trough 172 shown in FIGURE 1.

The use and operation of the invention have been described in detail hereinabove, and need not be repeated.

Although the present invention is fully capable of achieving the objects and providing the advantages hereinbefore mentioned it is to be understood that it is merely illustrative of the presently preferred embodiments thereof and I do not mean to be limited to the details of construction herein shown and described, other than as defined in the appended claims.

I claim:

[1. In a machine for bending a length of tubing that includes a vertical column, two spaced parallel shafts pivotally supported by said column, two plates rigidly affixed to said shafts, a vertically movable member supported from said column above said shafts, first power means for moving said member upwardly and downwardly, second power means for tending to restrain pivotal movement of said shafts as said member moves downwardly relative thereto, in combination:

(a) two elongate longitudinally aligned jaws supported from said plates, said jaws having a plurality of transversely spaced grooves of semi-circular cross section and of different diameters formed in the upper surfaces thereof, with each of said diameters being substantially the same as the external diameter of one of said lengths of tubing to be bent;

(b) a downwardly curved pressure-exerting member supported from the lower end of said vertically movable member, which pressure-exerting member has a plurality of transversely spaced grooves of semi-circular cross section formed in the lower surface thereof that are in vertical alignment with said grooves in said jaws and complementary in size relative thereto;

(c) a circular protractor;

(d) first means for removably affixing said protractor to a first end of a length of said tubing, with the center of rotation of said protractor being in alignment with the longitudinal axis of said length of tubing;

(e) an elongate horizontal protractor support that permits rotational and longitudinal movement of said protractor relative thereto;

(f) first means for adjustably holding said support in a manner to permit said support to occupy any one of a plurality of transverse positions relative to said column, with the diameter of said protractor and the height of said first means being so related that a length of tubing having said protractor mounted thereon is substantially horizontally disposed when said protractor rests on said support and a portion of said tubing rests in one of said grooves that is of substantially the same diameter as the external diameter of said length of tubing, and with the longitudinal axis of said length of tubing having said protractor mounted thereon lying in the same vertical plane as the longitudinal axis of one of said grooves when said support is in a particular one of said transverse positions; and (g) second means for measuring the longitudinal movement of said length of tubing having said protractor mounted thereon relative to said support as said tubing is intermittently advanced towards said jaws to have bends formed therein by the downward movement of said pressure-exerting member relative to said jaws, with the longitudinal spacing between said bends being determined by the relative movement of said length of tubing and protractor relative to said protractor support, and the circumferential angulation between said bends being determined by the degree of rotation of said length of tubing and protractor relative to said support.]

2. A machine as defined in claim [1] 6 wherein said protractor support comprises a rigid elongate channel that includes a web and two flanges extending upwardly from the longitudinal edges thereof, which flanges are of sufficient height that said protractor rests solely on the upper edges thereof.

3. A machine as defined in claim [1] 6 wherein said protractor has a centrally disposed tapped bore formed therein, and said first means includes:

(a) a threaded rod which engages said tapped bore;

(b) first and second heads on the ends of said rod, which first head is of sufficiently small cross section as to be insertable within said length of tubing to be bent on said machine;

(c) a washer mounted on said rod adjacent said first head; and (d) at least one resilient cylindrical body mounted on said rod between said washer and protractor, which body is capable of being inserted in said length of tubing, and which second head when rotated in an appropriate direction, compresses said body longitudinally and expands said body transversely into gripping contact with the interior of said length of tubing to removably hold said protractor in a transverse position on said first end thereof.

4. A machine as defined in claim [1] 6 which further includes means for automatically stopping the downward movement of said pressure-exerting member after a bend of desired angulation has been formed in said length of tubing.

5. A machine as defined in claim 4 which further includes means for automatically returning said pressure-exerting member to a position above that portion of said length of tubing in said jaws after said bend of desired angulation is formed in said length of tubing.

*6. In a tubing bending machine having a vertical column, two spaced parallel shafts pivotally supported from said column, two plates rigidly affixed to said shafts, a vertically movable member supported from said column and at least partially positioned above said plates, first fluid actuated power means for moving said member upwardly and downwardly, second power means which tend to restrain pivotal movement of said shafts as said member moves downwardly relative thereto, two elongate longitudinally aligned jaws supported from said plates, each of which jaws have at least one longitudinally extending first groove of semi-circular cross section formed therein of substantially the same diameter as the external diameter of the tubing that is to be bent, a downwardly curved pressure-exerting member supported from the lower end of said vertically movable member in which at least one groove of semi-circular cross section is formed in the lower surface thereof that is in vertical alignment with said first grooves in said jaws and of the same diameter as said first grooves, the improvement for bending a length of tubing to form a plurality of bends therein of desired angulation which are longitudinally spaced predetermined distances and with at least a portion of said bends lying in different radial planes that are disposed at desired circumferential angulation relative to one another, which improvement comprises:*

*(a) a circular protractor;*

*(b) first means extending outwardly from the center of said protractor for removably engaging a first end portion of said length of tubing and holding the center of said protractor in alignment with the longitudinal axis of said length of tubing;*

*(c) an elongate horizontal protractor support that permits rotational and longitudinal movement of said protractor relative thereto;*

*(d) first means for holding said support in a position relative to said column wherein when said protractor rests on said support said length of tubing to which said protractor is attached is substantially horizontally disposed, and the longitudinal axis of said length of tubing lies in the same vertical plane as that of said grooves;*

*(e) second means for measuring the longitudinal movement of said length of tubing on which said protractor is mounted relative to said support as said length of tubing is intermittently advanced towards said jaws to form bends therein by the downward movement of said pressure-exerting member relative to said jaws, with the longitudinal spacing between said bends being determined by the relative movement of said length of tubing and protractor relative to said protractor support, and with the circumferential angulation between said bends being determined by the degree of rotation of said length of tubing and protractor relative to said support; and*

*(f) visual means operatively associated with a portion of said machine that moves when a bend is being formed in said length of tubing for indicating when said bend has been formed to a desired angulation.*

*7. A tubing bending machine as defined in claim 6 wherein said visual indicating means includes:*

*(g) a pointer affixed to one of said shafts and extending radially therefrom; and*

*(h) a plate graduated in degrees over which said pointer moves as said pressure-exerting member moves downwardly to form a bend in said length of tubing.*

References Cited

The following references, cited by the Examiner, are of record in the patented file of this patent or the original patent.

UNITED STATES PATENTS

| | | | |
|---|---|---|---|
| 1,079,442 | 11/1913 | Rutledge | 72—389 |
| 1,610,193 | 12/1926 | Battle | 33—174 |
| 1,778,981 | 10/1930 | McLaughlin | 33—174 |
| 2,349,525 | 5/1944 | St. Clair | 72—34 |
| 2,464,459 | 3/1949 | Newlon | 72—389 |
| 2,797,724 | 7/1957 | Walldow | 72—413 |
| 2,840,135 | 6/1958 | Fowler | 72—43 |
| 2,887,141 | 5/1959 | Bower et al. | 72—396 |
| 2,998,838 | 9/1961 | Byrd | 72—389 |
| 3,021,886 | 2/1962 | Ferris | 72—389 |

RONALD D. GREFE, *Primary Examiner.*